D. H. TURNER.
Purifying Animal Charcoal.
No. 68,915.  Patented Sept. 17, 1867.
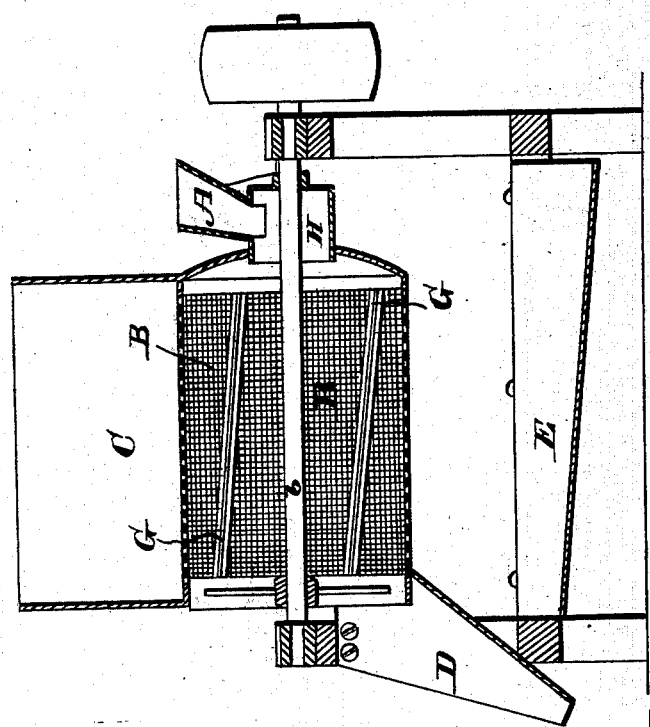
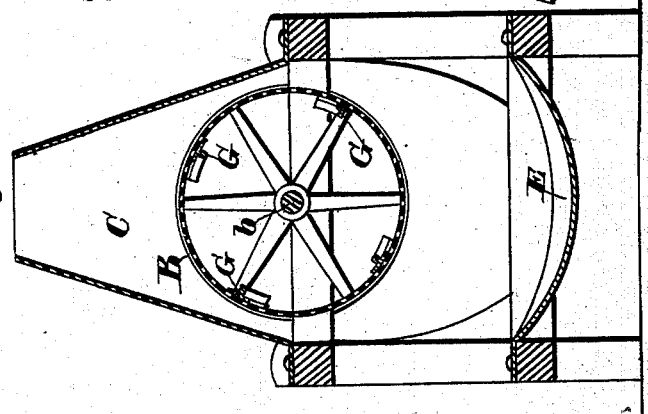
Witnesses:  Inventor:

United States Patent Office.

DANIEL H. TURNER, OF NEW YORK, N. Y.

Letters Patent No. 68,915, dated September 17, 1867.

---

IMPROVEMENT IN COOLING AND PURIFYING ANIMAL CHARCOAL.

---

*The Schedule referred to in these Letters Patent and making part of the same.*

---

TO ALL WHOM IT MAY CONCERN:

Be it known that I, DANIEL H. TURNER, of the city, county, and State of New York, have invented a new and useful Improvement in Cooling and Purifying Animal Charcoal, of which the following is a full, clear, and exact description, reference being had to the accompanying drawing, forming part of this specification, and in which—

Figures 1 and 2 represent sectional elevations, at right angles to each other, of an apparatus for cooling and purifying animal charcoal according to my improvement.

My improvement in cooling and purifying bone-black or animal charcoal it will suffice here to describe in connection with sugar refining, the utility and application of which substance to such purpose is well understood; but the improvement is, of course, applicable to cooling and purifying animal charcoal generally, or irrespective of the purpose for which it is required.

The ordinary method of cooling and purifying animal charcoal, as practised, for instance, in sugar refineries, is to dump the coal from wagons, as it is brought from the kilns, on to a large or roomy flagged floor, and then to arrange it in ridges and furrows, and frequently handle or turn it, to effect the cooling and removal of the noxious gases generated in the process of re-burning. This is not only a slow process, involving no little labor, but takes up considerable space, and creates much dust, to the loss and injury of the coal. These objections my improvement obviates, as by it the cooling is effected, and gases, dust, and other impurities removed in a comparatively close, compact, and expeditious manner, with a great saving in labor, and without acting on the coal in dense quantities at a time, which is so apt to produce injurious condensation and action on it, as regards its decoloring property, of the sundry and different gases generated in the process of re-burning. My invention, in this connection, consists in a novel process of cooling and purifying the coal by agitating or giving it a series of successive lifts as it is passed along a reticulated cylinder or body, through which a current of cold or cool air is made to pass; also, in a combination, for the purpose specified, of a revolving reticulated cylinder or vessel provided with lifting-strips, or otherwise equivalently constructed, upper trunk or flue for escape of the noxious gases, finer dust, and establishment of the draught, and suitable delivery devices for separate discharge of the coal and coarser dust.

The following will suffice to explain more minutely, referring at the same time to the accompanying drawing, how my invention is or may be carried out: The animal charcoal, after being re-burnt, is transferred in wagons, as drawn from the kilns, to an elevator, from and by which it is passed to a hopper, A, and from thence, by a tube or way, H, into or through the one and preferably closed end of a wire or perforated cylinder, or other-shaped reticulated vessel, B. This vessel is made to revolve by any suitable means, being hung on or carried by a horizontal or approximately horizontal shaft, $b$, resting in outside bearings; and, though preferably of cylindrical form, and provided with internal lifting-strips G, set spiral or straight, may be of decagonal or other polygonal shape in its transverse section, and is of any suitable length, open at its end opposite to that by which the charcoal is received into it. Said coal is thus made to pass slowly along the perforated cylinder B, and in such travel has the particles of which it is composed subjected to a succession of lifts by the strips G, falling back repeatedly as each strip approaches its uppermost position, and, whilst thus agitated and opened or distributed, is exposed to an ascending current of cold or cooling air from below, passing through the meshes of the cylinder, and around it up through a trunk or flue, C, said current carrying along with it the several noxious gases, and finest dust or other impurities, to any suitable receiver or outlet with which the trunk C is connected. This current may either be a natural draught, the heat of the coal aiding such, or it may be a blast produced by a blower below or suction device above. In this way is the coal cooled and purified, the cold and clean coal passing off by a chute, D, into barrels, wagons, or other suitable vessels, ready for use in the filters of the refinery, while the coarser and valuable dust, passing out through the meshes of the cylinder, is conveyed by a lower tray, E, to any suitable receiver. Not only, will it be seen, is the coal rapidly and effectually cooled, which is so tedious or slow and difficult to effect during warm weather under the ordinary process, but all detrimental gases and objectionable dust or dirt removed, with a great saving of space, which is of importance in refineries located in cities.

By this my improved process, in five minutes, or thereabouts, from the time the coal is drawn from the kilns may it be made ready for the filter-tanks, and at a uniform temperature.

What is here claimed, and desired to be secured by Letters Patent, is—

1. The process, substantially as herein described, of cooling and purifying animal charcoal by agitating or giving it a series of successive or repeated lifts as it is passed through or along a reticulated cylinder or vessel through which a current of cold or cooling air is made to ascend, essentially as herein set forth.

2. The combination, for the purpose or purposes specified, of a revolving reticulated cylinder or vessel provided with lifting-strips, or otherwise equivalently constructed, upper trunk or flue for escape of the noxious gases and finer dust, serving also for establishment of the draught, and suitable delivery-chutes or devices for separate discharge of the coal and coarser dust, substantially as described.

D. H. TURNER.

Witnesses:
    J. W. COOMBS,
    A. LE CLERC.